United States Patent [19]

Pircher

[11] Patent Number: 4,775,024
[45] Date of Patent: Oct. 4, 1988

[54] AUTOMATIC TRACKLESS SELF-PROPELLED CARRIAGE CONVEYANCE INSTALLATION

[75] Inventor: Herbert Pircher, Planegg, Fed. Rep. of Germany

[73] Assignee: Büro Patent AG, Glarus, Switzerland

[21] Appl. No.: 66,532

[22] Filed: Jun. 26, 1987

[30] Foreign Application Priority Data

Jun. 27, 1986 [CH] Switzerland .......................... 2612/86

[51] Int. Cl.$^4$ ............................................. B62D 1/24
[52] U.S. Cl. .................................. 180/168; 180/214; 318/587
[58] Field of Search ............... 180/167, 168, 210, 211, 180/213, 214; 280/47.11; 318/587

[56] References Cited

U.S. PATENT DOCUMENTS

| | | | |
|---|---|---|---|
| 1,828,905 | 10/1931 | Mossay | 180/214 X |
| 2,834,605 | 5/1958 | McCollough | 280/47.11 X |
| 3,245,493 | 4/1966 | Barrett, Jr. | 180/168 X |
| 3,628,624 | 12/1971 | Wesener | 180/168 |
| 3,903,979 | 9/1975 | Perrotin | 280/81 R |
| 4,307,329 | 12/1981 | Taylor | 180/168 X |

*Primary Examiner*—John J. Love
*Assistant Examiner*—Michael Mar
*Attorney, Agent, or Firm*—Werner W. Kleeman

[57] ABSTRACT

The carriage of the automatic trackless self-propelled carriage conveyance installation contains a steered front wheel arranged at the central lengthwise axis of the vehicle structure. There are also provided two steerable rear wheels. The steering structure of the front wheel is connected by a coupling rod with a central steering crank which, in turn, is connected via steering or tie rods with steering levers or arms of the rear wheels. To render posssible a faultless travel of the carriage through curves of a predeterminate path of travel or course, the arrangement is structured such that imaginary extensions of the rotational axes of the front and rear wheels, when undertaking a steering deflection or steering action at the carriage, intersect at a common point whose spacing from the median plane of the front wheel corresponds at least approximately to the radius of curvature of the path of travel. In this way, it is possible for such carriage to carry out an exact tracking of the path of travel during both its forward and reverse directions of travel, so that such automatic trackless self-propelled carriage conveyance installation can be arranged in narrow aisles or corridors or the like and can negotiate tight or small radii of curvature of predeterminate paths of travel intended for the carriage.

5 Claims, 2 Drawing Sheets

AUTOMATIC TRACKLESS SELF-PROPELLED CARRIAGE CONVEYANCE INSTALLATION

BACKGROUND OF THE INVENTION

The present invention relates to a new and improved construction of an automatic trackless self-propelled carriage conveyance installation or means.

In its more specific aspects, the present invention relates to a new and improved construction of an automatic trackless self-propelled carriage conveyance installation or means containing a self-propelled carriage defining a vehicle. and which carriage moves along a predeterminate path of travel or course. The carriage possesses a steered front wheel lying in the central or median lengthwise axis of the vehicle and also two rear wheels.

Automatic trackless carriage conveyance means of the previously mentioned type are known in various constructions, as for example, from the U.S. Pat. No. 3,245,493, granted Apr. 12, 1966. With that prior art design of automatic trackless carriage conveyance means, the steered front wheel of the carriage is equipped with a drive. Such prior art construction of carriage can normally only travel in forward direction on account of its steering geometry, i.e. the controlled drive wheel must be located in the front in the direction of travel of the carriage. With a reversal of the carriage travel direction, i.e. when the driven front wheel is pushing or propelling the carriage of the vehicle, uncontrollable vehicle movements tend to arise, especially when the carriage moves through or negotiates tight or narrow curves. Also, in the case of tight or small radii of curvature of the curves and in narrow aisles or corridors or the like, a simple steering of the front wheel does not suffice in order to guide the carriage precisely enough along the intended path of travel or course.

On the other hand, it is known from U.S. Pat. No. 3,628,624, granted Dec. 21, 1971, to equip a self-propelled trackless carriage with two individually driven wheels and with pivotable or swivelable travelling wheels. By differently driving the driven wheels, there can be then accomplished a steering of the carriage. This type of steering is very complicated and expensive since two independent drives or drive means and a complicated control device are needed, and even then, there is still not attained the desired successful operation since the carriage easily tends to carry-out undesired weaving or rolling motions.

SUMMARY OF THE INVENTION

Therefore with the foregoing in mind, it is a primary object of the present invention to provide a new and improved construction of an automatic self-propelled trackless carriage conveyance means or installation which is not afflicted with the aforementioned drawbacks and shortcomings of the prior art constructions.

Another important object of the present invention aims at the provision of an improved construction of an automatic trackless self-propelled carriage conveyance means or installation equipped with a self-propelled carriage which can reliably and accurately travel along a predeterminate path of travel or course both in forward direction and reverse direction in a highly controlled manner and is also able to negotiate narrow or constricted regions, such as narrow aisles or corridors or the like and can reliably and stabilely travel through curved paths or courses of travel of small radii of curvature.

Still a further significant object of the present invention aims at providing a new and improved construction of an automatic trackless self-propelled carriage conveyance or means which is relatively simple in construction and design, highly reliable in operation, not readily subject to breakdown or malfunction, requires a minimum of maintenance and servicing and wherein the self-propelled carriage of such installation is capable of travelling in both forward and reverse directions while accurately following a predeteminate path of travel or course and can negotiate tight curves or the like in a reliable and stable fashion.

Now in order to implement these and still further objects of the invention which will become more readily apparent as the description proceeds, the automatic trackless self-propelled carriage conveyance installation or means of the present invention is manifested by the features that the rear wheels are each constructed to be steerable. These steerable rear wheels are interconnected with one another by a path or course steering device as well as with the steering structure or means of the front wheel in such a manner that imaginary extensions or prolongations of the rotational axes of the front wheel and the rear wheels, when the carriage is subjected to a steering deflection or turning motion, intersect at a common point. The spacing of this common point from the central or median plane of the front wheel corresponds at least approximately to the radius of curvature of the predeterminate path of travel or course.

Each of the front and rear steerable wheels may be provided with a suitable conventional steering structure, such as a steering fork or an axle-pivot steering or steering knuckle or kingpin steering system.

By virtue of the fact that the rear wheels are steerable and specifically as a function of the steering of the front wheel and with individual accommodation of the inner and outer rear wheels to the curve or course to be negotiated by the carriage, there results a carriage construction that can exactly follow a predeterminate path of travel or course not only when moving in forward direction and reverse direction, but also is capable of exactly negotiating or travelling through even the most tight or narrow curves along the most tight or narrow paths of travel or courses.

With four-wheeled road vehicles, it is known to equip the front wheels as well as the rear wheels with an axle-pivot steering or steering knuckle or kingpin steering system of the afore-mentioned type and to coordinate the axle-pivot steering or steering knuckle or kingpin steering system of the front wheel with those of the rear wheels by a coupling rod. However, such axle-pivot steering or steering knuckle or kingpin steering system structure has not found acceptance in automatic trackless carriage conveyance installations or means, especially those equipped with three-wheeled carriages, although it is exactly for these type of carriage conveyance installations that an exact path negotiation or tracking along the predeterminate path of travel or course is important.

The invention contemplates different possible advantageous constructional features of the automatic trackless self-propelled conveyance installation or means as such will be discussed more fully hereinafter.

As to the design of the steering or guiding structure for steering the carriage along a predeterminate path of travel or course, there are available different possibilities. A particularly simple and practical solution is provided by an arrangement wherein, during substantially straight-line or linear motion of the carriage, a cantilevered arm or arm member extending transverse to the direction of carriage travel is arranged at the pivot or swivel axis or shaft of the front wheel. To the free or one end of this cantilevered arm, there is pivoted or hignedly connected a coupling rod which, while crossing the central or median lengthwise axis of the carriage of the vehicle is pivoted or hingedly connected at its other coupling rod end to a cantilevered or protruding arm of a central steering crank of a central steering crank unit or structure. This last-mentioned cantilevered or protruding arm likewise extends transverse to the central or median lengthwise axis of the carriage of the vehicle. This central steering crank is connected by means of a respective steering or tie rod with a respective steering lever or arm of an associated one of each of the steerable rear wheels.

The afore-mentioned steering or tie rods can be arranged at the central steering crank so as to cross or intersect.

Furthermore, the pivot or swivel axes or shafts of the wheels can each lie at the associated central or median plane of the related wheel. In particular, imaginary or hypothetical extensions or prolongations of such pivot or swivel axes or shafts of the wheels lie in the central or median plane of the related wheel.

As concerns the rear uheels, an advantageous construction is afforded, according to a further embodiment of the invention, if the pivot or swivel axes or shafts of the rear wheels are disposed laterally of the rear wheels themselves.

It is basically possible to drive the rear wheels. However, it is simpler to connect the front wheel with a drive device or drive means.

The inventive automatic trackless self-propelled carriage conveyance installation or means provided with the new and improved carriage permits constructing or laying-out a predeterminate path of travel or course in the narrowest or constricted regions, such as narrow aisles or corridors with the tightest or smallest radii of curvature of the curved portions of the predeterminate path of travel or travel course for the carriage and the carriage can reliably negotiate such paths of travel or travel courses in a faultless fashion both during forward movement as well as reverse movement of the carriage.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
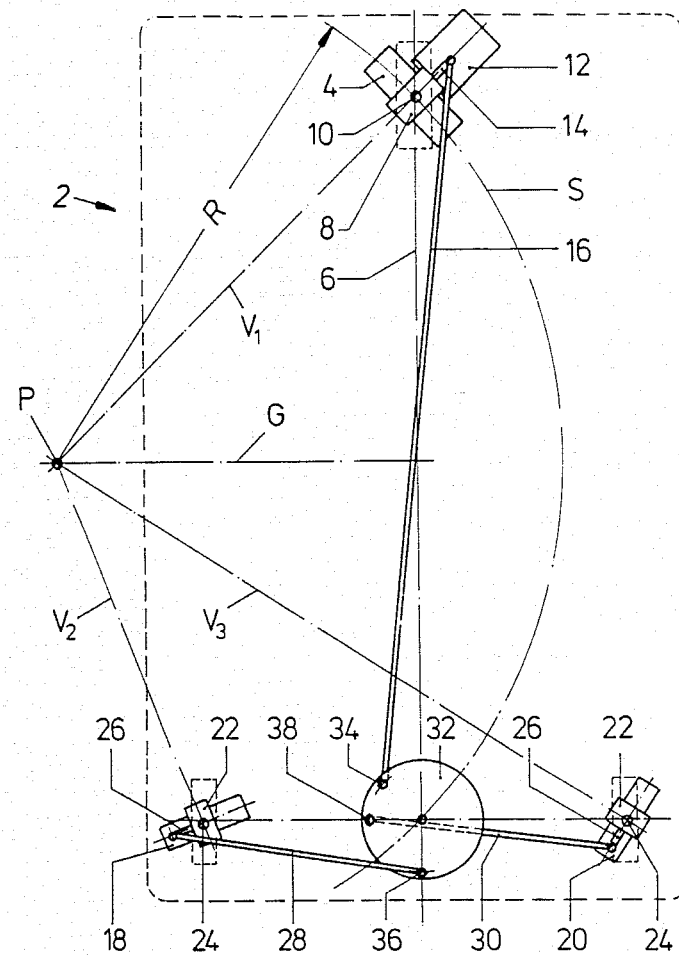
FIG. 1 schematically illustrates in sectional view, the chassis or undercarriage of a carriage of the automatic trackless self-propelled conveyance installation of the invention, the section being taken substantially along the section line I—I of FIG. 2.
Figure 2:
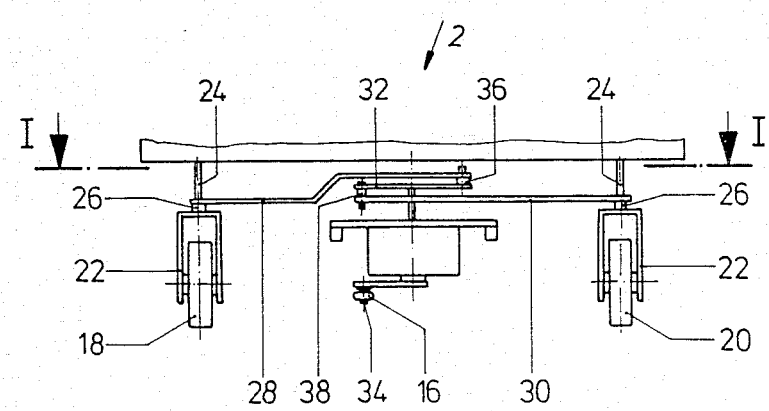
FIG. 2 illustrates the chassis of the carriage depicted in FIG. 1 viewed from the rear.

Describing now the drawings, it is to be understood that to simplify the showing thereof only enough of the structure of the inventive automatic trackless carriage conveyance installation or means has been illustrated therein as needed to enable one skilled in the art to readily understand the underlying principles and concepts of the present invention. Turning now specifically to FIGS. 1 and 2 of the drawings, there is depicted therein an exemplary embodiment of a schematically illustrated chassis or undercarriage of a carriage 2, whose outline or outer contour is conveniently merely indicated by the dotted lines. This carriage 2 of the vehicle of such conveyance installation contains a steered or steerable front wheel 4 positioned in the central or median lengthwise axis 6 of the carriage 2. The steered or steerable front sheel 4 is equipped with a suitable steering structure and in the embodiment under discussion, such steered or steerable front wheel 4 is seated in a wheel fork 8 or equivalent structure which is pivotable or swivelable about a pivot or swivel axis or shaft 10 by means of a conventional and therefore here not further shown steering device. At the wheel fork 8 there is provided a suitable drive means or driving arrangement 12 for appropriately driving the front wheel 4. A cantilevered arm or arm member 14 or equivalent structure is connected with the wheel fork 8 and lies substantially perpendicular to the central lengthwise axis 6 of the carriage 2 when this carriage 2 is travelling in a straight line or linearly. At the cantilevered arm or arm member 14 there is hingedly or pivotably connected a coupling rod or rod member 16 which leads to the likewise steered or steerable rear wheels 18 and 20.

Each of the steered or steerable rear wheels 18 and 20 are seated in an associated wheel fork 22, each of which is pivotable or swivelable about a pivot or swivel axis or shaft 24. Each such pivot or swivel axis or shaft 24 for the rear wheels 18 and 20 lies in the central or median plane of the associated rear wheel 18 and 20, as best seen by referring to FIG. 2. Steering levers or arms 26 are fixedly connected with the wheel forks 22. These steering levers or arms 26 lie at least approximately parallel to the central lengthwise axis 6 of the carriage 2 when such carriage 2 is moving in a substantially straight line.

The steering lever or arm 26 of each rear wheel 18 and 20 is steeringly connected by a respective steering rod or tie rod 28 and 30 with a central steering crank 32 of a central steering crank unit or structure. This central steering crank 32 is situated or lies substantially along the central lengthwise axis 6 of the carriage 2 of the vehicle. The coupling rod 16 is connected by a pivot joint or pivot 34 with the central steering crank 32 in such a manner that the coupling rod 16 crosses or intersects the central lengthwise axis 6 of the carriage 2 of the vehicle. The steering rods or tie rods 28 and 30 are likewise pivotably or hingedly connected by pivot joints or pivots 36 and 38, respectively, to the central steering crank 32 in such a manner that the steering rods or tie rods cross or intersect in a manner as will be evident from the showing of FIG. 2.

The arrangement is undertaken such that the imaginary or hypothetical extensions or prolongation lines $V_1$, $V_2$, and $V_3$ of the respective rotational axis of each of the front wheel 4, the inner rear wheel 18 and the outer rear wheel 20 intersect at a common point P. The distance or spacing of this common point P from the central or median plane of the front wheel 4 at least approximately corresponds to the radius of curvature R of the predeterminate path or path of travel or course S through which the carriage 3 is momentarily travelling. Moreover, this common point P lies on a straight line G which itself is disposed substantially perpendicular to the central lengthwise axis 6 of the carriage 2. As a result of this arrangement, the inner rear wheel 18 is pivoted or swivelled inwardly to a greater extent or more markedly than the outer rear wheel 20. Therefore, the common point of intersection or common point P forms the common center point of the circular or curved paths of travel or courses through which the front wheel 4 and the rear wheels 18 and 20 travel. In this way, it is possible for such carriage 2 to faithfully and accurately follow or track a travel path or course s with great accuracy both when moving in the forward as well as in the reverse direction of travel thereof.

Figure 3:
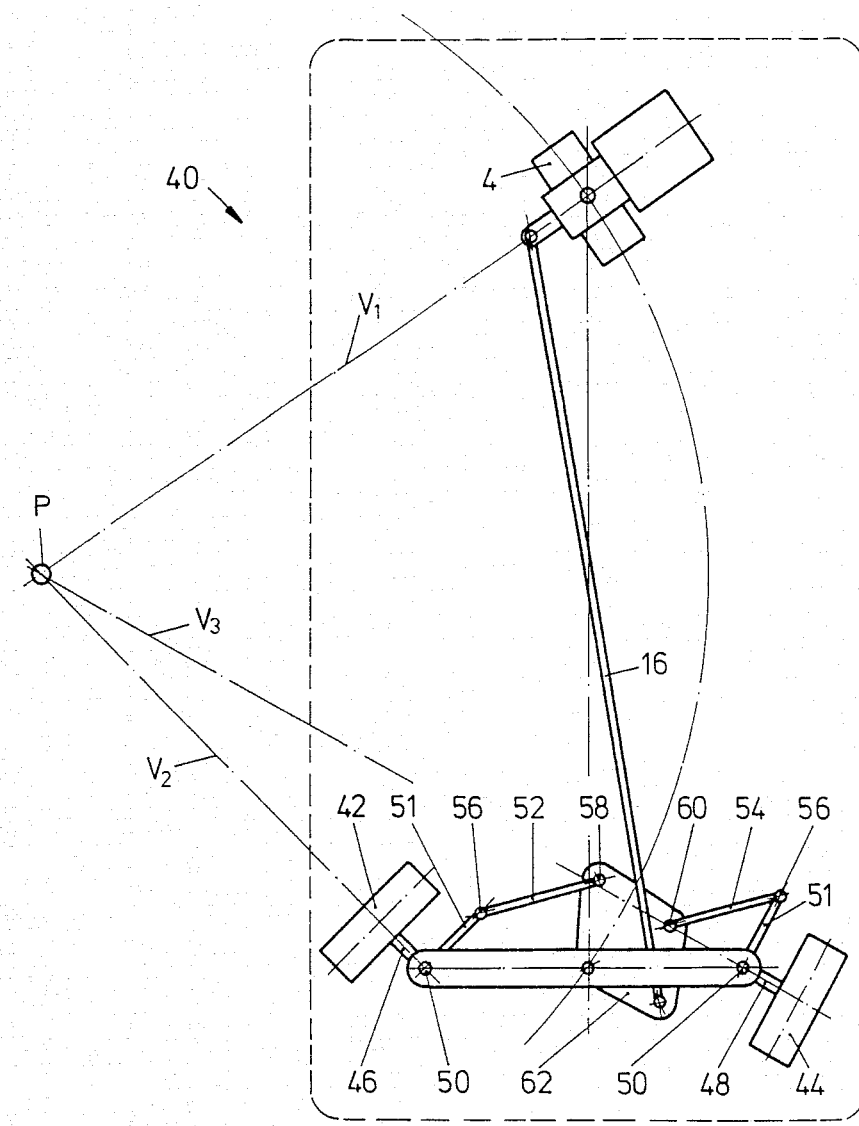
FIG. 3 illustrates a further construction of chassis of a carriage in a representation analogous to that shown for the embodiment of FIG. 1.

FIG. 3 shows a further construction of carriage 40 in similar portrayal or representation to that of the initial embodiment described with reference to FIG. 1, so that the same parts or components have been generally designated by the same reference characters. In contrast to the exemplary embodiment of FIGS. 1 and 2, in this arrangement the rear wheels 42 and 44 are not positioned in steering structures embodying wheel forks as heretofore described, but in axle journals or steering knuckles 46 and 48, whose swivel or pivot axles or shafts 50 in each case lie outside the respective central or median plane of the associated rear wheels 42 and 44. Steering rods or tie rods 52 and 54 are pivoted by means of pivot joints or pivots 56 at the steering levers or arms 51 of the axle journals or steering knuckles 46 and 48. These steering rods or tie rods 52 and 54 are then, in turn, connected by pivot joints or pivots 58 and 60 with a central steering crank 62 of a central steering unit or structure. A coupling rod or rod member 16 is pivoted or hinged to this central steering crank 62 at one of its ends and leads to the front wheel 4 at which location it is connected with its other end. The steering geometry itself again corresponds to that of the embodiment of FIG. 1.

In contrast to the exemplary embodiments herein depicted, in which the front wheel is driven, it would also be readily possible to design the arrangement such that the rear wheels are driven.

Furthermore, the coupling or coupling structure between the front wheel and the rear wheels need not be effected by a coupling rod but can be accomplished by a hydraulic device or mechanism at which, for example, a hydraulic transmitter or transmission cylinder is connected with the arm of the front wheel and a further hydraulic transmitter or transmission cylinder is connected with the central steering crank, and the transmitter or transmission cylinders are hydraulically coupled to each other.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. An automatic trackless self-propelled carriage conveyance means, comprising:
    a self-propelled carriage defining vehicle and movable along a course of travel including predeterminate path of travel having a radius of curvature;
    said carriage having a central lengthwise axis;
    said carriage being provided with a steerable front wheel having a median plane;
    said steerable front wheel lying essentialy at the central lengthwise axis of the carriage;
    said carriage being further provided with two rear wheels;
    means for enabling steering of the steerable front wheel;
    means provided for each of the rear wheels to render each of said rear wheels steerable;
    said steerable front wheel having an axis of rotation;
    each of said steerable rear wheels having a respective axis of rotation;
    a path steering device for interconnecting said steerable rear wheels with one another and with said means for enabling steering of the front wheel in such a manner that imaginary extensions of the rotational axes of the front wheel and the rear wheels, when the carriage is subjected to a steering deflection, intersect at a common point;
    said common point possessing a spacing from the median plane of the front wheel which corresponds at least approximately to the radius of curvature of the predeterminate path of travel;
    said means for enabling steering of the steerable front wheel comprises means defining a pivot axis about which said front wheel can swivel;
    a cantilevered arm extending transverse to the direction of travel of the carriage, during substantially linear motion of the carriage, arranged at said means defining a pivot axis of the front wheel;
    said cantilevered arm having a free end;
    a coupling rod having oppositely situated ends;
    said coupling rod being pivotably connected at one of said oppositely situated ends to said free end of said cantilevered arm;
    said path steering device comprising a central steering crank;
    said coupling rod crossing the central lengthwise axis of the carriage and being pivotably connected at the other one of said oppositely situated ends of said coupling rod to said central steering crank;
    said path steering device further including a respective steering rod and a respective steering lever provided for each steerable rear wheel; and
    said central steering crank being connected by means of said respective steering rod with said respective steering lever of an associated one of each of the steerable rear wheels.

2. The automatic trackless self-propelled carriage conveyance means as defined in claim 1, wherein:
    said respective steering rods of the steerable rear wheels are crossingly arranged at the central steering crank.

3. The automatic trackless self-propelled carriage conveyance means as defined in claim 1, wherein:
    each of said steerable rear wheels having a respective median plane;
    each of said wheels having a respective pivot axis;
    each pivot axis of said wheels defining an imaginary extension; and
    said imaginary extensions of said pivot axes of said wheels each being disposed in the median plane of an associated one of said wheels.

4. The automatic trackless self-propelled carriage conveyance means as defined in claim 1, wherein:

each of said steerable rear wheels having a respective median plane;

each of said wheels having a respective pivot axis;

each pivot axis of said wheels defining an imaginary extension; and said pivot axes of said rear wheels being laterally positioned from said rear wheels.

5. The automatic trackless self-propelled carriage conveyance means as defined in claim 1, further including:

drive means operatively connected with said front wheel.

* * * * *

UNITED STATES PATENT AND TRADEMARK OFFICE
CERTIFICATE OF CORRECTION

PATENT NO. : 4,775,024
DATED : October 4, 1988
INVENTOR(S) : HERBERT PIRCHER

It is certified that error appears in the above-identified patent and that said Letters Patent is hereby corrected as shown below:

Column 3, line 9, please delete "hignedly" and insert
    --hingedly--
Column 3, line 30, please delete "uheels" and insert
    --wheels--
Column 4, line 19, please delete "sheel" and insert --wheel--
Column 6, line 4, please delete "essentialy" and insert
    --essentially--

Signed and Sealed this

Twenty-eighth Day of March, 1989

Attest:

DONALD J. QUIGG

Attesting Officer

Commissioner of Patents and Trademarks